UNITED STATES PATENT OFFICE.

MAX NETTO, OF ALMAZARRON, SPAIN.

PROCESS OF PRECIPITATING PRECIOUS METALS FROM THEIR ALKALI CYANID SOLUTIONS.

SPECIFICATION forming part of Letters Patent No. 573,233, dated December 15, 1896.

Application filed March 16, 1896. Serial No. 583,491. (No specimens.)

*To all whom it may concern:*

Be it known that I, MAX NETTO, a citizen of the German Empire, residing in Almazarron, in the Kingdom of Spain, have invented certain new and useful Improvements in Processes of Precipitating Precious Metals from their Alkali Cyanid Solutions, of which the following is a specification.

This invention relates to an improved process of precipitating silver and gold from their cyanid solutions and of regenerating the alkali cyanid solution, so that it can be used again for the extraction of precious metals from their ores; and the invention consists of the process of precipitating silver and gold from their cyanid solutions by first acidulating the alkali cyanid solution with hydrochloric acid, then separating the precipitated chlorid of silver by filtration and subjecting the solution to the action of an electric current, so as to separate the gold, while the alkali cyanid solution is regenerated by the addition of caustic alkali.

My improved process is carried out in the following manner: The cyanid solution which contains silver, respectively gold, in the form of alkali cyanid of silver and alkali cyanid of gold, is acidulated with hydrochloric acid until a slightly-acid reaction is obtained. Silver chlorid is thereby precipitated, while the gold remains in the solution. The precipitation of silver chlorid is obtained according to the following equation, in which, for example, the combination of potassium cyanid with silver cyanid is assumed:

(1.) $AgK(CN)_2 + 2HCl = 2HCN + KCl + AgCl$. 

As the solution contains always alkali cyanid in excess it is obvious that by the addition of hydrochloric acid a decomposition takes place, as shown by the following equation:

(2.) $KCN + HCl = HCN + KCl$.

The precipitate which is composed of silver chlorid is separated by filtration, washed, and the silver contained therein obtained by any approved process. The solution from which the silver chlorid has been separated still contains a certain quantity of gold and is for the purpose of obtaining the gold subjected to the action of electrolysis, whereby the complete separation of this metal is obtained as it is deposited on the cathodes with simultaneous generation of hydrogen. Care has to be taken during the process that the gold-containing solution, which is subjected to the action of an electric current, contains a sufficient quantity of hydrochloric acid. For the cathodes gold is used by preference.

The solution from which the gold has been separated by the electric current is next mixed with caustic alkali until a slightly-alkaline reaction takes place. This reaction is illustrated by the following equation:

(3.) $HCN + KOH = H_2O + KCN$. 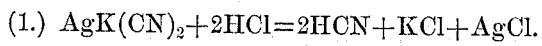

The alkali chlorid which is contained in the solution, as shown by equations 1 and 2, remains perfectly indifferent during this reaction, so that the alkali cyanid which was used is quantitatively regenerated.

The advantages of my improved process of precipitating silver and gold from their cyanid solutions are contained in the fact that the alkali cyanid, of which a considerable quantity is contained in the solution, is regenerated in the simplest and cheapest manner. The regenerated solution can be used directly again for the extraction of precious metals from their ores and becomes then only unfitted for further use when by a frequent repetition of the process the quantity of alkali chlorid present in the solution becomes gradually too great.

Having thus described my invention, I claim as new and desire to secure by Letters Patent—

1. The process herein described of precipitating silver and gold from their alkali cyanid solutions, which consists in acidulating the alkali cyanid solution containing said metals by hydrochloric acid so as to precipitate silver chlorid, separating the precipitated silver chlorid by filtration from the solution, and subjecting the acid filtrate to the action of an electric current so as to deposit the gold on the cathode, substantially as set forth.

2. The process herein described of precipitating silver and gold from their alkali cyanid solutions, which consists in acidulating the alkali cyanid solution containing said metals with hydrochloric acid so as to precipitate silver chlorid, separating said silver chlorid by filtration, subjecting the acid filtrate to the action of the electric current so as to deposit the gold on the cathode, and regenerating the cyanid solution by the addition of caustic alkali, substantially as set forth.

In testimony that I claim the foregoing as my invention I have signed my name in presence of two subscribing witnesses.

MAX NETTO.

Witnesses:
E. MONTINEZ,
JOSÉ LORMAN.